United States Patent
Connearney et al.

(10) Patent No.: US 9,020,995 B2
(45) Date of Patent: Apr. 28, 2015

(54) HYBRID RELATIONAL, DIRECTORY, AND CONTENT QUERY FACILITY

(75) Inventors: Colleen S. Connearney, Arlington, MA (US); Michael W. Cross, Portsmouth, NH (US); John R. McGarvey, Apex, NC (US); Christopher R. Seekamp, Boca Raton, FL (US); Ajamu Wesley, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 2345 days.

(21) Appl. No.: 11/617,558

(22) Filed: Dec. 28, 2006

(65) Prior Publication Data

US 2008/0162427 A1 Jul. 3, 2008

(51) Int. Cl.
*G06F 12/00* (2006.01)
*G06F 17/30* (2006.01)

(52) U.S. Cl.
CPC .............................. *G06F 17/30595* (2013.01)

(58) Field of Classification Search
USPC .................................. 707/1–4, 828, 829, 830
See application file for complete search history.

(56) References Cited

U.S. PATENT DOCUMENTS

| | | | | |
|---|---|---|---|---|
| 5,860,132 A | * | 1/1999 | Carter et al. | 711/170 |
| 6,199,062 B1 | * | 3/2001 | Byrne et al. | 1/1 |
| 7,275,083 B1 | * | 9/2007 | Seibel et al. | 709/206 |
| 7,453,439 B1 | * | 11/2008 | Kushler et al. | 345/168 |
| 2002/0129012 A1 | * | 9/2002 | Green | 707/3 |
| 2004/0186826 A1 | * | 9/2004 | Choi et al. | 707/3 |
| 2005/0027702 A1 | * | 2/2005 | Jensen et al. | 707/3 |
| 2005/0060340 A1 | * | 3/2005 | Sommerfield et al. | 707/102 |
| 2005/0102276 A1 | * | 5/2005 | Dinh et al. | 707/3 |
| 2005/0108211 A1 | * | 5/2005 | Karimisetty et al. | 707/3 |
| 2005/0267871 A1 | * | 12/2005 | Marchisio et al. | 707/3 |
| 2006/0293880 A1 | * | 12/2006 | Elshishiny et al. | 704/10 |

* cited by examiner

*Primary Examiner* — Tony Mahmoudi
*Assistant Examiner* — Mohammad Rahman
(74) *Attorney, Agent, or Firm* — Cuenot, Forsythe & Kim, LLC

(57) ABSTRACT

A method of data storage and retrieval using a relational database can include defining a first table in a relational database including a plurality of entries having a first value for a first field. A second table in the relational database including a plurality of entries can be defined. Each of the plurality of entries in the second table can specify an additional value for the first field of a corresponding entry in the first table. Responsive to a query, a data item selected from at least one of the plurality of entries in the first table can be presented.

10 Claims, 2 Drawing Sheets

HYBRID RELATIONAL, DIRECTORY, AND CONTENT QUERY FACILITY

BACKGROUND OF THE INVENTION

A "white pages" application refers to a type of computer program that provides similar functionality as is provided by white pages telephone directories distributed in print form. Typically, a white pages application can provide, upon request, names, addresses, and/or telephone numbers. Modern white pages applications have evolved to a point where significantly more information can be provided though the application that has been provided in the past. For example, a white pages application can specify file services, print services, as well as other information that may be stored in a corporate directory. A white pages application usually is constructed in the form of a directory. As known, directories are well suited for fast read access, but can be slower for write operations.

The expanding functionality of white pages applications has led to a situation in which it is not uncommon for the application to draw information from a plurality of disparate data sources. While some information may be resident within the white pages application itself, much data is actually retrieved from different data systems that are independent of the white pages application. For example, a white pages application may access additional information from a human resources database, a content management data store, a skills database, an archive of unstructured data, or the like.

Accessing data from a plurality of different sources can be inefficient. Often, one or more of the different data sources accessed by the white pages application maintains a data schema that is not optimized for use with the query sets provided by the white pages application. In consequence, while the white pages application itself may be fast, when accessing one or more external data sources the performance may slow considerably. Another byproduct of utilizing external data sources with a white pages application is that each disparate system that is accessed may be located a significant physical distance from where the white pages application is hosted. This can introduce network delays further reducing performance.

BRIEF SUMMARY OF THE INVENTION

The present invention relates to a method of data storage and retrieval using a relational database. The method can include defining a first table in a relational database including a plurality of entries having a first value for a first field. A second table in the relational database including a plurality of entries can be defined. Each of the plurality of entries in the second table can specify an additional value for the first field of a corresponding entry in the first table. Responsive to a query, a data item selected from at least one of the plurality of entries in the first table can be presented.

The present invention also relates to a method of data storage and retrieval using a relational database that includes identifying an unstructured data item to be stored in the relational database and determining a size of the unstructured data item. A field can be selected from a plurality of different fields reserved for storing unstructured data items of different sizes. The field can be selected according to the size of the unstructured data item. The unstructured data item can be stored within the selected field.

Yet another embodiment of the present invention can include a computer program product including a computer-usable medium having computer-usable code that, when executed, causes a machine to perform the various steps and/or functions described herein.

DETAILED DESCRIPTION OF THE INVENTION

Figure 1:
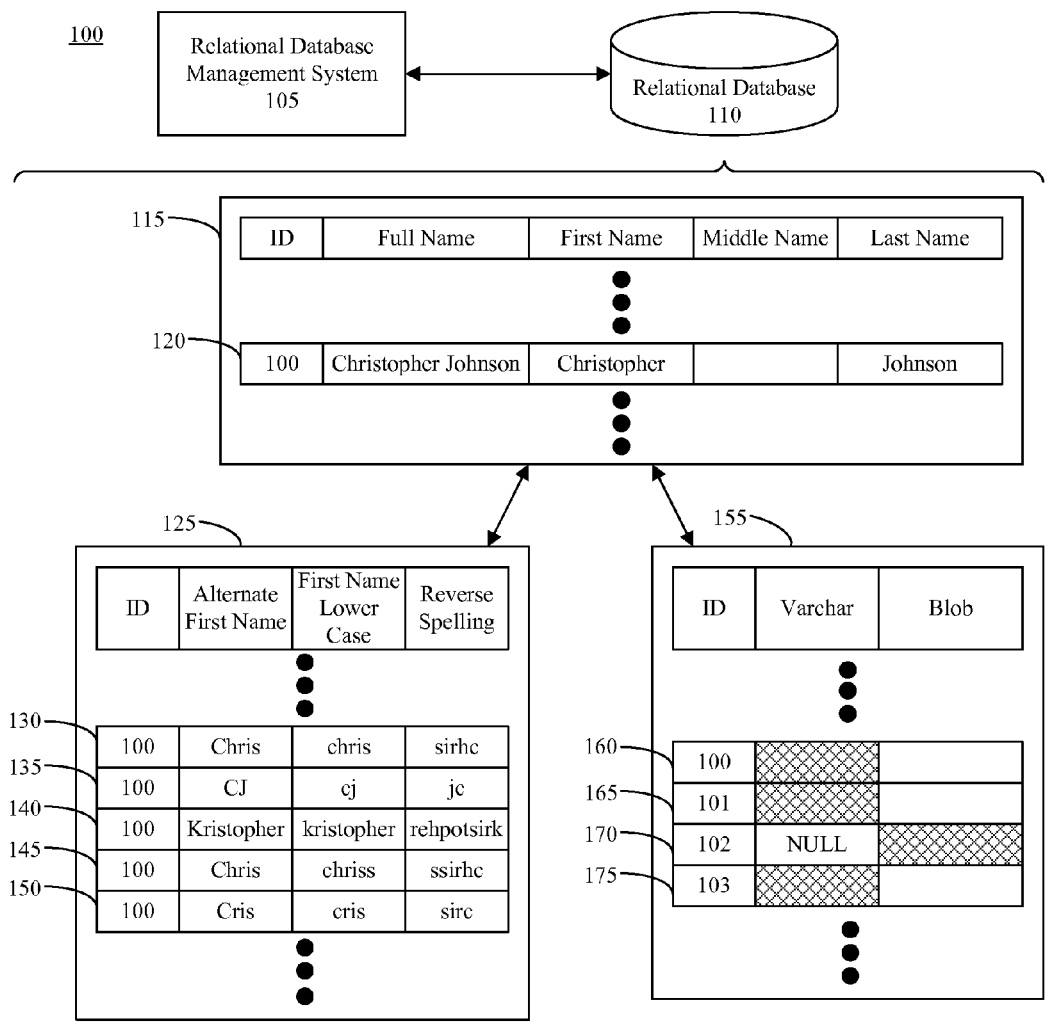
FIG. 1 is a block diagram illustrating a system in accordance with an aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to a hybrid data storage and retrieval system that can store directory, relational, and unstructured data within a single underlying relational database management system (RDBMS). The architecture disclosed herein can be applied to a white pages application. Due to the different types of data that can be efficiently stored and searched, the embodiments disclosed herein can reduce, if not eliminate, the need for utilizing different data sources.

FIG. 1 is a block diagram illustrating a system 100 in accordance with one aspect of the present invention. The system 100 can be a white pages application which comprises a relational database management system (RDBMS) 105 and a relational database (database) 110. As known, the RDBMS 105 is a computer program, or collection of computer programs that creates and manages the database 110. The RDBMS 105 can implement the querying, storing, updating, and purging of data with respect to the database 110. The database 110 is the collection of data items managed by the RDBMS 105. The database 110 conforms to a specified "relational" schema as will be described herein.

The database 110 can include a plurality of related tables 115, 125, and 155. In accordance with one aspect of the present invention, additional values for a field can be stored by creating an additional table in lieu of additional columns. As shown, table 115 can include a plurality of entries corresponding to different users for which contact information, profile information, or any other sort of data can be stored. For purposes of illustration, table 115 has been limited to displaying only name information. Accordingly, table 115 includes an identifier field indicated by the heading "ID", a full name field indicated by the heading "Full Name", a first name field indicated by the heading "First Name", a middle name field indicated by the heading "Middle Name", as well as a last name field indicated by the heading "Last Name".

Within conventional RDBMSs, when additional data items are added to the database 110, additional columns, e.g., fields, are added to existing tables. For instance, if additional name fields are needed, such fields typically would be added to table 115 in the form of additional columns. In illustration, if the white pages application is to be enhanced to store a nickname for each user, a nickname field would be added to the database 110. This field would be added as a column in table 115. This sort of updating, however, requires an administrator to implement.

If a conventional RDBMS is to be expanded further, for example, with a second nickname field, the administrator would have to add a second nickname column to table 115. As can be seen, the amount of additional, or alternative, names for a user is limited and must be contemplated by the designer of a conventional RDBMS. This manner of expansion can be limiting in that it requires substantial database redesign. Moreover, searching additional fields in a table can be time consuming and inefficient.

Table 125 provides additional space for storing alternative names, or additional values for the name field. Rather than adding additional columns to table 115, an additional table, table 125, can be defined in the system 100. Table 125 can be used to store additional values for one or more fields specified in table 115. By using a table 125 in lieu of adding columns to the table 115, a virtually unlimited number of additional values, in this case names, can be stored for a given field of table 115. This structure lends itself to more efficient searching. Thus, as indicated by the ID field, each entry 130-150 in table 125 is related to the entry 120 in table 115.

In one embodiment, for each entry in the table 115, zero or more entries can be made in the table 125 that specify a different nickname or alias. For example, entry 130 indicates that "Christopher Johnson" has a nickname of "Chris". Entry 135 indicates that "Christopher Johnson" also has a nickname of "CJ". Further nicknames can be specified simply by adding entries to table 125. This process does not require the intervention of an administrator or any sort of system redesign. Though not shown, table 125 also can include an entry specifying "Christopher", which is a copy of the original value from the table 115 that is being expanded in table 125.

In another embodiment, entries can be added to table 125 that specify varied spellings for the entry 120 in table 115 as well as varied spellings for aliases entered in table 125. For example, entries 140-150 each specify a different spelling for the first name "Christopher" or any alias or other variation of that name (e.g., different spellings for "Chris"). The spellings may or may not be spellings found in common usage. In any event, by including a plurality of possible spellings for each name in table 125, "fuzzy" searching is implemented. That is, queries can be directed to table 125 thereby allowing a user to locate "Christopher Johnson" in table 115 despite spelling his name incorrectly, providing a nickname, or the like in the query.

In another aspect of the present invention, the entries 130-150 of table 125 have further columns or fields which specify the value, in this case the first name, in normalized fashion. One way of normalizing the value of an entry is rewriting the value in lowercase. By including a field in each entry that lists the name in lowercase, more efficient searching can be performed as case becomes irrelevant. If case is to be considered, then a different column can be used for purposes of searching. It should be appreciated that in lieu of having separate columns for "Alternate First Name" and "First Name Lowercase", the "First Name Lowercase" column can be used. That is, the "Alternate First Name" column need not be included.

Another way of normalizing a value can be to specify the value in lowercase and in reverse order. As can be seen, the first name "chris" has been included in a reverse order field and is spelled "sirhc". The reverse spelling field facilitates wildcard searches where the wildcard is pre-pended to a search term. Searches that specify a search parameter having an appended wildcard, e.g., "chr*", can be performed in a performant manner. As known, a "wildcard" refers to a special character, such as an asterisk (*) or a question mark (?), that is used to represent zero or more characters. Searches that specify a parameter having a pre-pended wildcard, e.g., "*hris", can take significantly more time. By including a column with the reverse spelling, a pre-pended wildcard query can be transformed into an appended wildcard query. For example, a search specifying "*hris" can be reversed as "sirh*" and then compared to the reverse spelling fields thereby resulting in a faster search, i.e., one that is no longer pre-pended.

In describing table 125, different fields such as "Alternate First Name", First Name Lowercase" and "Reverse Spelling" have been described. In another embodiment of the present invention, one or more of these fields, or columns, can be implemented within a separate table. That is, rather than including the fields as columns in table 125, the columns can be removed and a new table can be created that is dedicated to one or more of those fields. Thus, for example, an additional table can be defined that has entries specifying an ID and the lowercase version of the different name variations. Another table can be defined that has entries including an ID and a reverse spelling.

Table 155 illustrates another aspect of the present invention. Table 155 can be used to store unstructured data. Unstructured data typically refers to data items such as media files, e.g., audio files, video files, and the like. Within the context of a white pages application, for example, an unstructured data item that may be stored can include, but is not limited to, a picture file for a user profile, an audio pronunciation file for a user's name, etc.

The RDBMS 105 can evaluate the size of the unstructured data item that is to be stored and select an appropriate field or data type in which the unstructured data item will be stored based upon the size of the item. In one embodiment, for example, a field can be defined called "varchar" that is 32 KB in size. The field can be configured for storing binary data, but be limited in size. Another larger field can be defined, which can be referred to as a "blob". If 32 KB serves as the upper limit of the smaller field for unstructured data items, a blob then can range in size from anything larger than 32 KB up to, in some cases, 4 GB, depending upon the particular RDBMS 105 and database 110 being used.

In any case, when an unstructured data item is to be stored, the RDBMS 105 can determine the size of that data item automatically. If the unstructured data item is less than or equal to 32 KB, the unstructured data item can be stored within a varchar field of table 155. If the unstructured data item is larger than 32 KB, the unstructured data item can be stored within a blob. Entries 160-175 illustrate cases where an unstructured data item has been stored within an entry. Shaded blocks in each column indicate that an unstructured data item is stored in that field for a given entry. Thus, entries 160, 165, and 175 have unstructured data items stored within the varchar fields as those data items are less than 32 KB. Entry 170 has an unstructured data item stored in the blob field as that data item is larger than 32 KB.

It should be appreciated that the sizes noted herein are provided for purposes of illustration only. Larger or smaller sizes for each respective field for storing unstructured data items can be used. Further, one or more other differently sized fields can be provided for storing unstructured data. For example, data items less than or equal to 32 KB in size can be stored in varchar, data items larger than 32 KB, but less than or equal to 5 MB, can be stored in a field called "varchar2" (not shown), and unstructured data items larger than 5 MB can be stored in a blob. Few or more fields for storing unstructured data items can be provided and the present invention is not intended to be limited to the number of available fields or the size ranges of data items that each field may accommodate.

Storing unstructured data in different fields according to size allows more efficient querying. For example, in one embodiment, a query directed to locating unstructured data items can first search the varchar fields of the entries in the table 155 for a match. If the desired entry is located, and the varchar field indicates a "null", the RDBMS 105 can be configured to initiate a second query. The second query can be directed at searching the blob fields of table 155. This approach can be more efficient than using a single field for any unstructured data, particularly when the majority of the data is stored in the smaller unstructured data item field.

Those skilled in the art will recognize that a white pages application, or any other RDBMS-based system, can include a large number of tables and a large number of entries within each table. The tables shown in FIG. 1 have been provided for purposes of illustration only and are not intended to limit the present invention in any way. Further, the techniques and principles applied with respect to the first name fields, for example, can be applied to other fields, particularly fields upon which searching is to be performed.

Figure 2:
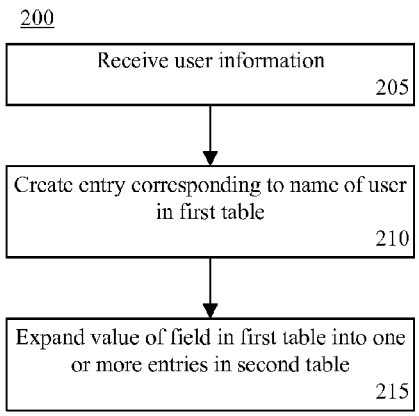
FIG. 2 is a flow chart illustrating a method in accordance with another aspect of the present invention.

FIG. 2 is a flow chart illustrating a method 200 in accordance with another aspect of the present invention. The method 200 can be implemented using a system such as the one described with reference to FIG. 1. In step 205, user information can be received by the system. The user information can include various data items such as contact information, media files, organizational data such as position, area of expertise, or any other information that is to be stored within the white pages application.

For purposes of illustration, for example, it can be assumed that the information provided includes a name of a user for which an entry is being created or otherwise updated. In step 210, an entry can be created that corresponds to the name provided by the user. The entry can be created in a first table.

In step 215, the entry created in step 210 can be expanded in a second table. More particularly, one or more entries can be created in the second table. Each of the created entries can be associated with the entry in the first table. In one embodiment, the entries created within the second table can be created from additional information provided from the user. For example, one or more entries, of an unknown or undetermined number, can be created from a plurality of nicknames that are provided by the user.

In another embodiment, one or more varied spellings can be generated automatically and added as entries into the second table. The alternate spellings can be created for the actual name of the user as well as for any nickname or other alias of the user that is added as an entry into the second table.

In another embodiment, within each entry in the second table, or in a third or fourth table as noted, additional fields can be written. For each entry in the second table, for example, a field can be written that specifies the value of the nickname or alias normalized to lowercase. In another example, a field can be written for each entry that specifies the name in reverse order.

Figure 3:
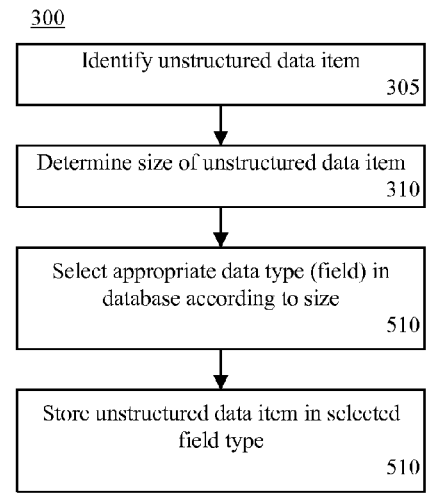
FIG. 3 is a flow chart illustrating a method in accordance with another aspect of the present invention.

FIG. 3 is a flow chart illustrating a method 300 in accordance with another aspect of the present invention. The method 300 can be performed by a system such as the system illustrated with reference to FIG. 1 and illustrates one automatic technique for handling the storage of unstructured data items. In step 305, an unstructured data item that is to be stored within the RDBMS can be identified. In step 310, the size of the unstructured data item can be determined. In step 315, a date type, or field, can be selected according to the size of the unstructured data item. As noted, different data types for storing unstructured data items can be designated for storing unstructured data items of particular sizes. In step 320, the unstructured data item can be stored using the selected data type. That is, an entry within the appropriate table can be created which stores the unstructured data item within the selected field.

Figure 4:
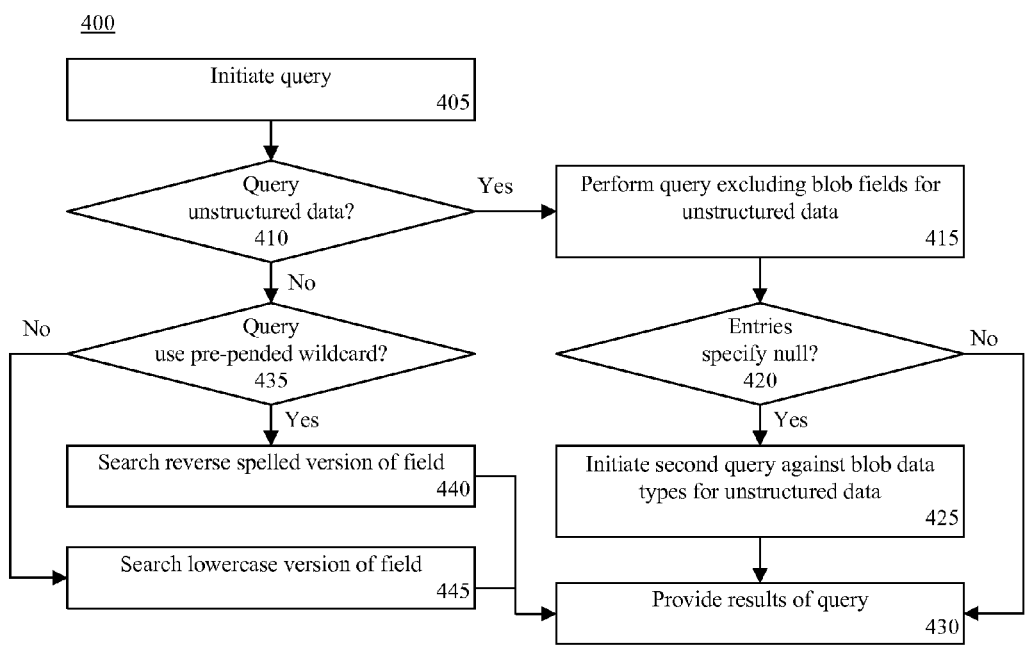
FIG. 4 is a flow chart illustrating a method in accordance with another aspect of the present invention.

FIG. 4 is a flow chart illustrating a method 400 in accordance with another aspect of the present invention. The method 400 can be implemented by a system such as the system illustrated with reference to FIG. 1. The method 400 presents a representative method of handling a query in accordance with one embodiment of the present invention. The method can begin in step 405 where a query to the database can be initiated.

In step 410, a determination can be made as to whether unstructured data within the database is the subject of the query. If so, the method can continue to step 415. If not, the method can proceed to step 435. In step 415, the query can be performed by first searching the smaller of the fields reserved for storing unstructured data items. For example, the query can be limited to searching the varchar fields and, at least initially, exclude the blob fields from the search.

In step 420, the RDBMS can determine whether of the entries located by the query specify a null within the varchar field. If no entries specify a null, that condition is indicative that all matching entries have unstructured data stored within the varchar fields and not in the larger blob fields. Accordingly, the method can proceed to step 430 where the unstructured data items for the located entries can be provided as query results.

If one or more entries found by the query do specify a null, the method can proceed to step 425. In step 425, the query can be reinitiated and the blob field can be the subject of the search. In step 430, results from the queries can be combined and provided. That is, any entries located by the first query dealing with the varchar fields can be joined with results from the second query relating to the blob fields and presented or processed further.

Continuing with step 435, where the query is not directed to searching unstructured data items, a determination can be made as to whether the query specifies a pre-pended wildcard to a search term. If so, the method can continue to step 440. If not, the method can proceed to step 445. In step 440, where a search term includes a pre-pended wildcard, the query can be limited to searching within a reverse spelled column. For example, if a search is being implemented that specifies "*is" as a search parameter for a first name, the pre-pended wildcard can cause the RDBMS to reverse the order of the search term and pre-pended wildcard to "si*" and then apply the query to the reverse spelled first name field. After step 440, the method can proceed to step 430.

If no pre-pended wildcard is specified as a search term, the method can continue to step 445, where the lowercase values of the fields corresponding search term are searched. For example, if the search term specifies a nickname, the fields in the second table that include lowercase characters can be searched. After step 445, the method can proceed to step 430 to present the query results.

After the query has finished, the results that are displayed can be taken from the primary table, e.g., the full name field or another that includes capitalization. In accordance with one embodiment of the present invention, the tables specifying additional values for a field of another table can be used solely for purposes of searching. Data that is to be drawn from the system, displayed, etc., can be taken from tables specifying original values, e.g., not "additional" values as described herein. In this manner, a search for "Kris" can yield the user "Christopher Johnson".

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of data storage and retrieval using a relational database comprising:
    defining a first table in a relational database comprising a plurality of entries having a first value for a first field;
    defining a second table in the relational database comprising a plurality of entries, wherein each of the plurality of entries in the second table includes a second field and a third field for the first field of a corresponding entry in the first table, wherein the second field is reserved to store a media file having a size equal to or smaller than a threshold value and the third field is reserved to store a media file having a size greater than the threshold value;
    determining a size of a media file to be stored, the media file corresponding to the first value in the first field in at least one of the plurality of entries of the first table;
    selecting from the second field and at least the third field a field for storing the media file according to a size of the media file;
    storing the media file in the selected field; and
    responsive to a query, presenting a data item selected from at least one of the plurality of entries from the first table and the corresponding media file stored in the selected field.

2. The method of claim 1, further comprising, for each entry in the first table, creating an associated entry in the second table that specifies the first value as an additional value.

3. The method of claim 2, further comprising defining the additional value to be an alias for the first value.

4. The method of claim 1, further comprising, responsive to the query, searching fields of a third table storing a normalized version of a query term.

5. The method of claim 1, further comprising, responsive to the query, searching fields of a third table comprising lowercase versions of the additional value.

6. A method of data storage and retrieval using a relational database comprising:
    defining a first table in a relational database comprising a plurality of entries having a first value for a first field;
    defining a second table in the relational database comprising a plurality of entries, wherein each of the plurality of entries in the second table is reserved to store a media file for the first field of a corresponding entry in the first table;
    responsive to a query for unstructured data, initiating a first search by searching only fields reserved for storing a smallest size of media files;
    responsive to detecting a null in an entry located by the first search, initiating a second search of only fields reserved for storing a larger size of media files; and
    responsive to the query, presenting a data item selected from at least one of the plurality of entries from the first table and a corresponding larger size media file identified in the second search.

7. A computer program product comprising:
    a computer-readable storage device, wherein the computer-readable storage device is not a transitory, propagating signal per se, having computer-usable program code stored thereon that stores and retrieves data, said computer program product including:
    computer-usable program code that defines a first table in a relational database comprising a plurality of entries having a first value for a first field;
    computer-usable program code that defines a second table in the relational database comprising a plurality of entries, wherein each of the plurality of entries in the second table includes a second field and a third field for the first field of a corresponding entry in the first table, wherein the second field is reserved to store a media file having a size equal to or smaller than a threshold value and the third field is reserved to store a media file having a size greater than the threshold value;
    computer-usable program code that determines a size of a media file to be stored, the media file corresponding to the first value in the first field in at least one of the plurality of entries of the first table;
    computer-usable program code that selects from the second field and at least the third field a field for storing the media file according to a size of the media file;
    computer-usable program code that stores the media file in the selected field; and
    computer-usable program code that, responsive to a query, presents a data item selected from at least one of the plurality of entries from the first table and the corresponding media file stored in the selected field.

8. The computer program product of claim 7, further comprising computer-usable program code that stores in a third table a normalized version of each additional value.

9. The computer program product of claim 8, further comprising computer-usable program code that, responsive to the query, searches fields of the third table storing a normalized version of a query term.

10. A computer program product comprising:
    a computer-readable storage device, wherein the computer-readable storage device is not a transitory, propagating signal per se, having computer-usable program code stored thereon that stores and retrieves data, said computer program product including:
    computer-usable program code that defines a first table in a relational database comprising a plurality of entries having a first value for a first field;
    computer-usable program code that defines a second table in the relational database comprising a plurality of entries, wherein each of the plurality of entries in the second table is reserved to store a media file for the first field of a corresponding entry in the first table;
    computer-usable program code that, responsive to a query for unstructured data, initiates a first search by searching only fields reserved for storing a smallest size of media files;
    computer-usable program code that, responsive to detecting a null in an entry located by the first search, initiates a second search of only fields reserved for storing a larger size of media files; and computer-usable program code that, responsive the query, presents a data item selected from at least one of the plurality of entries from the first table and a corresponding larger size media file identified in the second search.

* * * * *